United States Patent [19]
Graves et al.

[11] Patent Number: 5,021,880
[45] Date of Patent: Jun. 4, 1991

[54] DIGITAL VIDEO SIGNAL COMPRESSION

[75] Inventors: Alan F. Graves, Kanata; Raymond L. Greenfield, London; Barry B. Hagglund, Nepean, all of Canada

[73] Assignee: Northern Telecom Limited, Montreal, Canada

[21] Appl. No.: 538,627

[22] Filed: Jun. 13, 1990

[51] Int. Cl.$^5$ .............................................. H04N 7/12
[52] U.S. Cl. ...................................... 358/138; 358/133
[58] Field of Search ................. 358/138, 135, 133, 13, 358/160; 382/56

[56] References Cited

U.S. PATENT DOCUMENTS

| | | | |
|---|---|---|---|
| 4,320,416 | 3/1982 | Dischert et al. | 358/133 |
| 4,396,937 | 8/1983 | Reitmeier et al. | 358/138 X |
| 4,531,151 | 7/1985 | Hentschke | 358/13 |
| 4,622,579 | 11/1986 | Starck | 358/13 |
| 4,661,862 | 4/1987 | Thompson | 358/335 |
| 4,868,654 | 9/1989 | Juri et al. | 358/138 X |
| 4,901,139 | 2/1990 | Wilkinson et al. | 358/13 |

OTHER PUBLICATIONS

L. Brett Glass, "Digital Video Interactive", Byte, May 1989, pp. 283 to 289.

Primary Examiner—Victor R. Kostak
Attorney, Agent, or Firm—R. John Haley

[57] ABSTRACT

Digital samples of an HDTV video signal are compressed by determining groups each of three successive samples in the video signal lines, the groups in adjacent lines being offset from one another, and transmitting only a first sample in each group. Each of the second and third samples in each group is compared with magnitudes averaged from three adjacent, transmitted, first samples, one in each of the previous, same, and following video signal lines, to determine a closest match. A 2-bit code representing this closest match is transmitted for each of these second and third samples in each group. The groups, and hence the first samples, are offset from one another in adjacent video signal lines, and the sampling frequency is desirably an odd multiple of half the video signal line frequency to offset the sampled pixels in adjacent video signal lines. The invention provides a high compression ratio, which can be further increased by DPCM encoding of the successive first samples.

20 Claims, 3 Drawing Sheets

DIGITAL VIDEO SIGNAL COMPRESSION

This invention relates to a method of, and apparatus for, compressing a digital video signal.

BACKGROUND OF THE INVENTION

It is well known to convert an analog video signal, such as the video components of a television signal, from its conventional analog form into a digital signal. Such a digital signal has a large bandwidth, and in order to reduce this various video signal compression schemes have been proposed.

One such compression scheme is described in Dischert et al. U.S. Pat. No. 4,320,416 issued Mar. 16, 1982 and entitled "Technique for Optimally Encoding Digitally Encoded Video Signals". In this scheme, alternate 8-bit samples of the digital video signal are not transmitted, and instead of each such sample which is not transmitted two "filter control" or steering bits are transmitted. At a receiver, the steering bits are used to determine which of four possible averages of adjacent pairs of transmitted samples is used to reconstruct the non-transmitted sample. This scheme provides a compression ratio of 16:10 (two 8-bit samples are replaced by one 8-bit sample and two steering bits) or 1.6.

The bandwidth of proposed HDTV (high definition television) systems is much greater than that of conventional television signals, requiring very high bit rates for digital transmission of HDTV signals. An effective compression scheme, with a high compression ratio, for digital HDTV signals is therefore particularly desirable. However, it is important that any compression scheme which is used should not seriously detract from the relatively high definition of such signals, at least as far as the visual perception of the viewer of the eventually reproduced video signal is concerned.

For distribution of digital video signals, it is desirable that the signals be conveniently accommodated by existing and proposed communications systems. In particular, it is desirable that such signals be conveniently distributable via optical communications systems operating in accordance with the SONET (synchronous optical network) standard. In such systems, an STS-3c signal payload provides a bit rate of 149.76 Mb/s, and it is desirable for a digital HDTV signal to be accommodated within this bit rate. An STS-3c signal is an STS-3 level signal in which the STS (synchronous transport signal) envelope capacities of 3 STS-1s are concatenated and transported as a single entity.

An object of this invention, therefore, is to provide an improved method of compressing digital video signals.

SUMMARY OF THE INVENTION

According to this invention there is provided a method of providing a compressed digital video signal comprising the steps of: providing digital video signal samples at a sampling frequency, the samples representing respective pixels in lines of a video signal; determining groups each of three successive samples in the video signal lines, the groups in adjacent lines being offset from one another; representing a first sample in each group by a first number of bits; comparing each of a second and a third sample in each group with magnitudes derived in a predetermined manner from a plurality of adjacent first samples to determine a closest match; and representing each of the second and third samples in each group by a second number of bits indicative of the closest match, the second number being less than the first number.

This method facilitates the provision of a higher compression ratio than the known compression scheme described above, without sacrificing the quality of the video signal when it is reconstructed at a receiver. Accordingly, the method of the invention is particularly advantageous when applied to digital HDTV signals, but it is also applicable to conventional, e.g. NTSC, television signals in digital form.

Preferably the plurality of adjacent first samples comprise an adjacent first sample in each of the previous, same, and following video signal lines, and the magnitudes with which each second or third sample is compared include an average of at least two of these three adjacent first samples in the previous, same, and following video signal lines.

Desirably, the magnitudes with which each second or third sample is compared comprise an average of each combination of two of the three adjacent first samples in the previous, same, and following video signal lines. In this case these magnitudes preferably further comprise a weighted average of the three adjacent first samples in the previous, same, and following video signal lines. This provides a total of four comparisons, so that the second number is conveniently two.

In a preferred embodiment of the invention the sampling frequency is an odd multiple of half the video signal line frequency, whereby the samples represent pixels which are offset from one another in adjacent video signal lines. In this case preferably the groups in adjacent lines are offset from one another by 1.5 samples. This provides a regular geometry which results in reduced errors in averaging and reconstructing the second and third samples.

The step of representing the first samples each by a first number of bits can comprise differentially encoding the successive first samples in order to provide a further compression of the signal, enabling it to be conveniently carried within an STS-3c signal payload.

The invention also provides apparatus for compressing digital video signal samples representing respective pixels in lines of a video signal, comprising: timing means for determining groups each of three successive samples in the video signal lines, the groups in adjacent lines being offset from one another; means for representing a first sample in each group by a first number of bits; means for comparing each of a second and a third sample in each group with magnitudes derived in a predetermined manner from a plurality of adjacent first samples to determine a closest match; and means for representing each of the second and third samples in each group by a second number of bits indicative of the closest match, the second number being less than the first number.

BRIEF DESCRIPTION OF THE DRAWINGS

The invention will be further understood from the following description with reference to the accompanying drawings, in which similar references are used in different figures to denote similar components and in which:

Referring to FIGS. 1 to 3, in each figure there is illustrated part of a video raster, in each case including parts of 5 video lines n−2 to n+2, in which video pixels are represented by solid circles 10 and open circles 12. In each figure each solid circle 10 represents a pixel which is transmitted, for example as an 8-bit byte of luminance information, and each open circle 12 represents a pixel which is not transmitted but instead which is reconstructed at the receiver from the information for adjacent transmitted pixels as described below. For each non-transmitted pixel represented by an open circle 12, a steering code comprising two steering bits is transmitted as described below.

FIG. 1 illustrates the prior art compression scheme described in U.S. Pat. No. 4,320,416 already referred to. A pixel P in a video line n is not transmitted, but instead a 2-bit steering code is transmitted for this pixel. At the transmitter, the luminance information of the non-transmitted pixel P is compared with the average of the luminance information of four pairs of transmitted pixels adjacent the pixel P, these pairs being represented as A—A, B—B, C—C, and D—D in FIG. 1. These four pairs of adjacent transmitted pixels are represented by the four possible values of the 2-bit steering code, and the steering code bits for the pixel P are selected to represent that pair of transmitted adjacent pixels whose average is closest to the actual luminance of the pixel P. At the receiver, the luminance of the pixel P is reconstructed from the average of the pair of transmitted pixels which is represented by the steering bits.

As can be appreciated, if as is common each pixel's luminance information is represented by an 8-bit value, then this prior art compression scheme provides a compression from 8+8 bits to 8+2 bits for two adjacent pixels, i.e. a compression ratio of 16:10 or 1.6.

Figure 2:
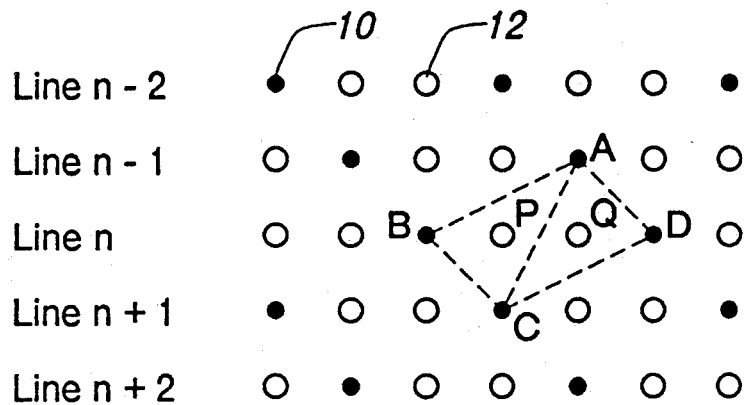
FIG. 2 is a diagram illustrating a form of digital video signal compression in accordance with an embodiment of this invention.
Figure 3:
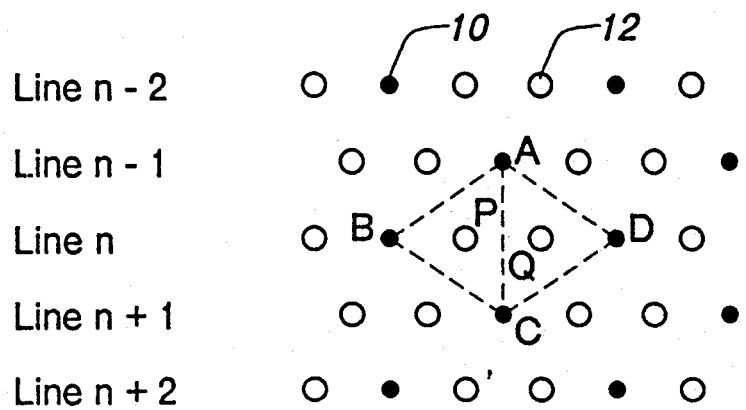
FIG. 3 is a diagram illustrating a preferred form of digital video signal compression in accordance with this invention.

The embodiments of the invention represented in FIGS. 2 and 3 provide a higher compression ratio. In each case only one of every three pixels is transmitted and hence represented by a solid circle 10, two steering bits being transmitted for each non-transmitted pixel represented by an open circle 12. Thus for 8-bit pixels, in each case the compression is from 8+8+8 to 8+2+2 bits for each group of three adjacent pixels, i.e. a compression ratio of 24:12 or 2.0.

In each of FIGS. 2 and 3, a non-transmitted pixel P in a video line n is reconstructed from one or more of three adjacent transmitted pixels, namely an adjacent transmitted pixel A in the preceding video line n−1, an immediately adjacent transmitted pixel B in the same video line n, and an adjacent transmitted pixel C in the following video line n+1. Similarly, a non-transmitted pixel Q in the video line n is reconstructed from one or more of three adjacent transmitted pixels, namely the adjacent transmitted pixel A in the preceding video line n−1, an immediately adjacent transmitted pixel D in the same video line n, and the adjacent transmitted pixel C in the following video line n+1.

Thus in each of FIGS. 2 and 3, the pixels in each video signal line are divided into groups each of three successive pixels, e.g. the pixels B, P, and Q in the line n. In each group of three pixels, the first pixel or sample (e.g. A, B, C, or D) is transmitted, and a steering code is transmitted for the second pixel or sample (e.g. P) and another steering code is transmitted for the third pixel or sample (e.g. Q). The groups of pixels are offset from one another in adjacent lines, so that in each of FIGS. 2 and 3 the first samples or transmitted pixels B and D in the video signal line n are not vertically aligned with the first sample or transmitted pixel A in the previous video signal line n−1 or with the first sample or transmitted pixel C in the following video signal line n+1.

Figure 1:
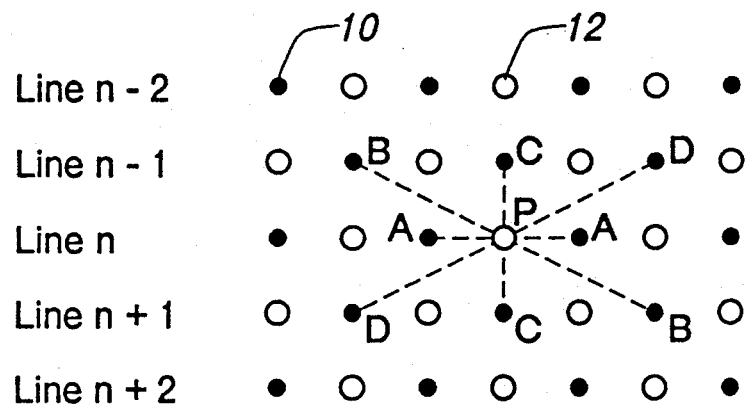
FIG. 1 is a diagram illustrating a known form of digital video signal compression.

The illustrations of FIGS. 2 and 3 differ only in that in FIG. 3 the pixels in alternate video lines are staggered in an offset sampling pattern, so that the groups of three pixels in adjacent lines are offset from one another by 1.5 pixels or samples. This offset sampling pattern is achieved by making the sampling frequency an odd integer multiple of half the video line scan frequency as described further below, and provides an improvement over the rectangular pixel sampling pattern of FIG. 2. As the pattern of FIG. 3 is preferred, only this is discussed in the following detailed description. The pattern of FIG. 3 provides a regular geometry which achieves the same resolution as the compression scheme of FIG. 1, but with a higher compression ratio.

For each non-transmitted pixel P (the following comments apply equally to each non-transmitted pixel Q, replacing each reference to the transmitted pixel B by a reference to the non-transmitted pixel D), the two steering bits which are transmitted can represent any one of four possible weightings of one or more of the adjacent transmitted pixels A, B, and C. The particular weightings which are used are a matter for design choice, but (representing the luminance information of the pixels by the corresponding pixel letters themselves) weightings of (A+B)/2, (A+C)/2, (B+C)/2, and ((A+B)/2+C)/2 can for example be used advantageously. Alternatively, the last weighting could be replaced by the average of all of the adjacent transmitted pixels, i.e. (A+B+C)/3, or by some other desirable value.

Thus at the transmitter, the actual luminance of the pixel P is compared with the luminance value weightings (A+B)/2, (A+C)/2, (B+C)/2, and ((A+B)/2+C)/2, and the 2-bit steering code for the pixel P is selected to represent the closest luminance value weighting. At the receiver, the steering bits are used to reconstruct the non-transmitted pixel P from the closest weighting of the transmitted pixels A, B, and C.

The following description relates to the application of the compression scheme described above with reference to FIG. 3 to an HDTV signal which is assumed to have 1125 video lines in two interleaved fields per frame, with 30 frames per second. The video line scan frequency is therefore 30×1125=33.75 kHz. These figures are given by way of example, and the invention is equally applicable to other situations, and to conventional digital video signals as well as to HDTV signals.

As is well known, the human eye is much less sensitive to color than it is to brightness. For this reason, it is possible to transmit chrominance (color) information of a video signal with a much lower resolution than is necessary for the luminance (brightness) information. To this end, chrominance subsampling is known, for example from an article by L. Brett Glass entitled "Digital Video Interactive", Byte, May 1989, pages 283 to 289 at page 284.

In the present application, the chrominance information is transmitted only for every third transmitted luminance pixel (and hence only for every ninth sampled pixel), and chrominance information is represented by only 7 bits per pixel rather than the 8 bits per pixel for the luminance information. Furthermore, the two different chrominance components (e.g. R-Y and B-Y) are transmitted on alternate video lines.

In view of the chrominance information transmission only for every ninth sampled pixel, the half line scan frequency multiplier already mentioned must be divisible by 9 to achieve a stationary sampling pattern. The sampling frequency is desirably at least about 2.2 times the highest frequency to be sampled, which in this case is 20 MHz, while not being so high that it presents problems for the speed of digital signal processing circuitry. Considering these factors, in the present case the sampling frequency is selected to be 2637 times half the line scan frequency of 33.75 kHz, or 44.499375 MHz.

With the above figures, the total bit rate required for transmission of the luminance and steering bits is 44.499375 MHz × 8 bits/2 = 177.9975 Mb/s. The transmitted chrominance bit rate is 44.499375 MHz × 7 bits/9 = 34.610625 Mb/s, giving a total bit rate of 212.608125 Mb/s for the HDTV video signal. This can be accommodated within two uncompressed digital NTSC channels.

As has already been stated, however, it is desirable to accommodate such signals within a SONET STS-3c payload, which provides a bit rate of 149.76 Mb/s. To achieve this, further compression of the video signal is required, as described below.

For example, DPCM (differential pulse code modulation) may be used to reduce the bit rates of the luminance information (not the steering bits) and chrominance information. In addition, it is not necessary to transmit all of the line blanking interval of the video signal, which represents at least 11% of the video line period and can be easily reconstituted at the receiver.

As one example, the transmitted luminance pixels can be encoded using 6-bit DPCM to give an overall luminance compression ratio of 24:10 or 2.4 and a bit rate for the luminance samples and steering bits of 148.33125 Mb/s. The chrominance information can be encoded using 4-bit DPCM to reduce the chrominance bit rate to 19.775 Mb/s, giving a total bit rate of 168.10875 Mb/s. Removing the line blanking interval of 11% of this gives a bit rate of less than 149.76 Mb/s.

As an alternative example, the transmitted luminance pixels can be encoded using 5-bit DPCM to give an overall luminance compression ratio of 24:9 or 2.67 and a bit rate for the luminance samples and steering bits of 133.498125 Mb/s. With the chrominance information encoded as above using 4-bit DPCM the total bit rate is 153.275625 Mb/s. Removing less than 3% of the line blanking interval gives a bit rate of less than 149.76 Mb/s.

In either of the above examples, a digital audio signal can be accommodated in the path overhead (POH) of the STS-3c signal, which provides a bit rate of 576 kb/s of which for example 256 kb/s can be used to provide 16-bit stereo audio signals. In the latter of the above examples, a higher quality audio signal, such as that provided using compact disk technology, could be accommodated by replacing additional parts of the video line blanking interval.

Figure 4:
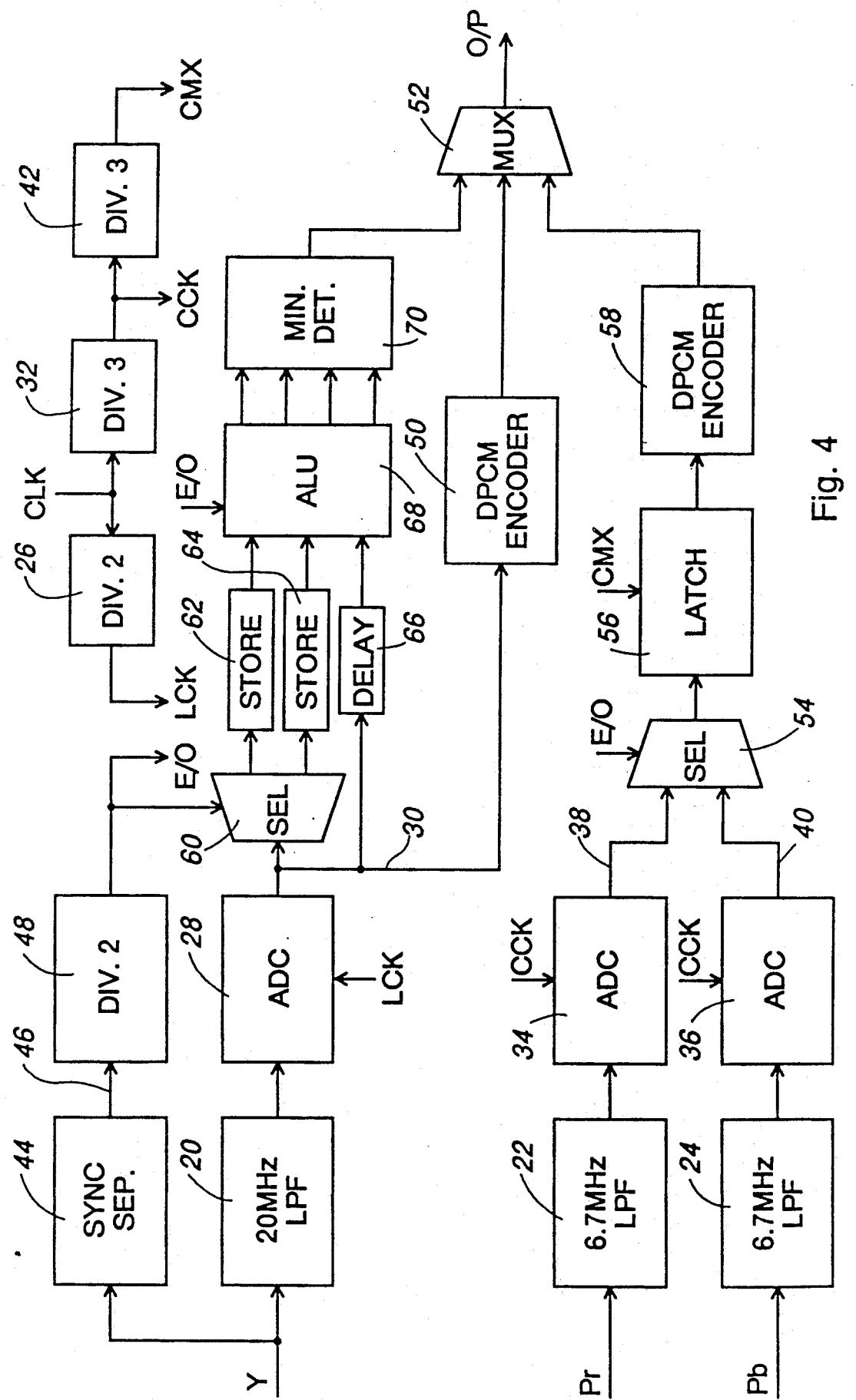
FIG. 4 is a block diagram illustrating a digital HDTV signal encoder which implements the compression illustrated by FIG. 3.

FIG. 4 is a block diagram illustrating a digital HDTV signal encoder which implements the compression illustrated by FIG. 3. The encoder is supplied with an analog baseband luminance signal Y and analog baseband chrominance signals Pr and Pb for red and blue color components respectively of an HDTV video signal. These signals are filtered by low pass filters 20, 22, and 24 respectively to avoid alias components as a result of sampling, these filters having bandwidths of 20, 6.7, and 6.7 MHz respectively commensurate with the bandwidths required for the respective video signal components. The color component signals require only one third the bandwidth of the luminance component because of the lower color resolution of the human eye as already discussed.

The encoder is also supplied with a clock signal CLK at a frequency of 88.99875 MHz, which is divided in frequency by 2 in a divider 26 to produce a luminance sampling clock signal LCK at the sampling frequency of 44.499375 MHz which is determined as already described above. The filtered luminance signal Y is sampled at this frequency and converted into an 8-bit digital signal on a line 30 by an ADC (analog-to-digital converter) 28.

The signal CLK is also divided in frequency by 3 in a divider 32 to produce a chrominance sampling clock signal CCK at a frequency of 29.66625 MHz, which is supplied to two ADCs 34 and 36 to which the respective filtered chrominance signals are supplied to be sampled at this frequency and converted into 7-bit digital signals on lines 38 and 40. The signal CCK is further divided in frequency by 3 in a divider 42 to produce a chrominance multiplexer signal CMX at a frequency of 9.88875 MHz.

The luminance signal Y is also supplied to a sync separator circuit 44 which can be of known form for determining the timing of line (horizontal) and vertical synchronizing pulses in the video signal. This circuit produces on a line 46 a line synchronizing signal at the video line frequency of 33.75 kHz. This signal is divided in frequency by 2 in a divider 48 to produce a signal E/O whose state alternates for even and odd-numbered video lines in each field.

The digital luminance signal on the line 30 is encoded into 5-bit DPCM form by a DPCM encoder 50, and the resulting signal is supplied to a video signal output (O/P) multiplexer 52. For each video line, depending on the state of the signal E/O, a selector 54 supplies one of the chrominance signal components on the lines 38 and 40 to a latch 56, which latches these chrominance signal components under the control of the chrominance multiplexer signal CMX. The output of the latch 56 is converted into 4-bit DPCM form by a DPCM encoder 58, and the resulting signal is supplied to the multiplexer 52.

The remaining parts of the encoder serve for producing the steering bits, and comprise a selector 60, two video line stores 62 and 64, a delay circuit 66, an ALU (arithmethic logic unit) 68, and a minimum detection logic circuit 70.

The selector 60 is controlled by the signal E/O to supply the digital luminance signal on the line 30 to the stores 62 and 64 in alternate video lines. Each store has storage capacity for the luminance signal samples of one video line. Thus for example during an odd-numbered video line n−1 the store 62 may be filled with the luminance signal samples of that line, and in the following even-numbered video line n the store 64 is filled with the luminance signal samples of this line. In the next odd-numbered line n+1, the data in the store 62 is overwritten by the signal samples of this line, and so on. The timing phases of writing into and reading from the stores 62 and 64 are arranged so that data is read out from the stores immediately before it is over-written. Signal samples read from the stores are supplied to the ALU 68, which is also supplied with the current samples on the line 30 via the delay circuit 66, which serves for equalizing signal delays to the ALU. The ALU 68 is also supplied with the signal E/O so that its operation is synchronized to that of the selector 60.

Using the above example and with reference to FIG. 3, during a current line n+1 the luminance signal sample A of the line n−1 is supplied to the ALU 68 from the store 62, and is then overwritten by the sample C of the current line. This sample C is supplied to the ALU 68 from the line 30 via the delay circuit 66, and the samples B and P of the previous line n are supplied to the ALU 68 from the store 64. The ALU 68 is set up to calculate the magnitudes of the quantities $P-(A+B)/2$, $P-(A+C)/2$, $P-(B+C)/2$, and $P-((A+B)/2+C)/2$ and produce these at its outputs. This occurs for all of the pixels of the current video line in turn (with replacement of B by D for the pixels Q as previously explained), and is repeated for successive video lines with reversal of the functions of the stores 62 and 64 in alternate lines under the control of the signal E/O.

The minimum detection logic circuit 70 detects which of the above quantities has the least or minimum value, and produces at its output the 2-bit steering code representing the corresponding one of the four inputs from the ALU 68. This 2-bit steering code is supplied to the multiplexer 52.

The multiplexer 52 is controlled by the synchronizing and timing signals described above to multiplex together the 2-bit steering codes, 5-bit DPCM luminance signals, and 4-bit DPCM chrominance signals supplied to it in a desired manner. For the compression described above, for each sequence of nine sampled pixels the multiplexer 52 would be controlled to multiplex together three 5-bit DPCM luminance signals, six 2-bit steering codes, and one 4-bit DPCM chrominance signal.

Figure 5:
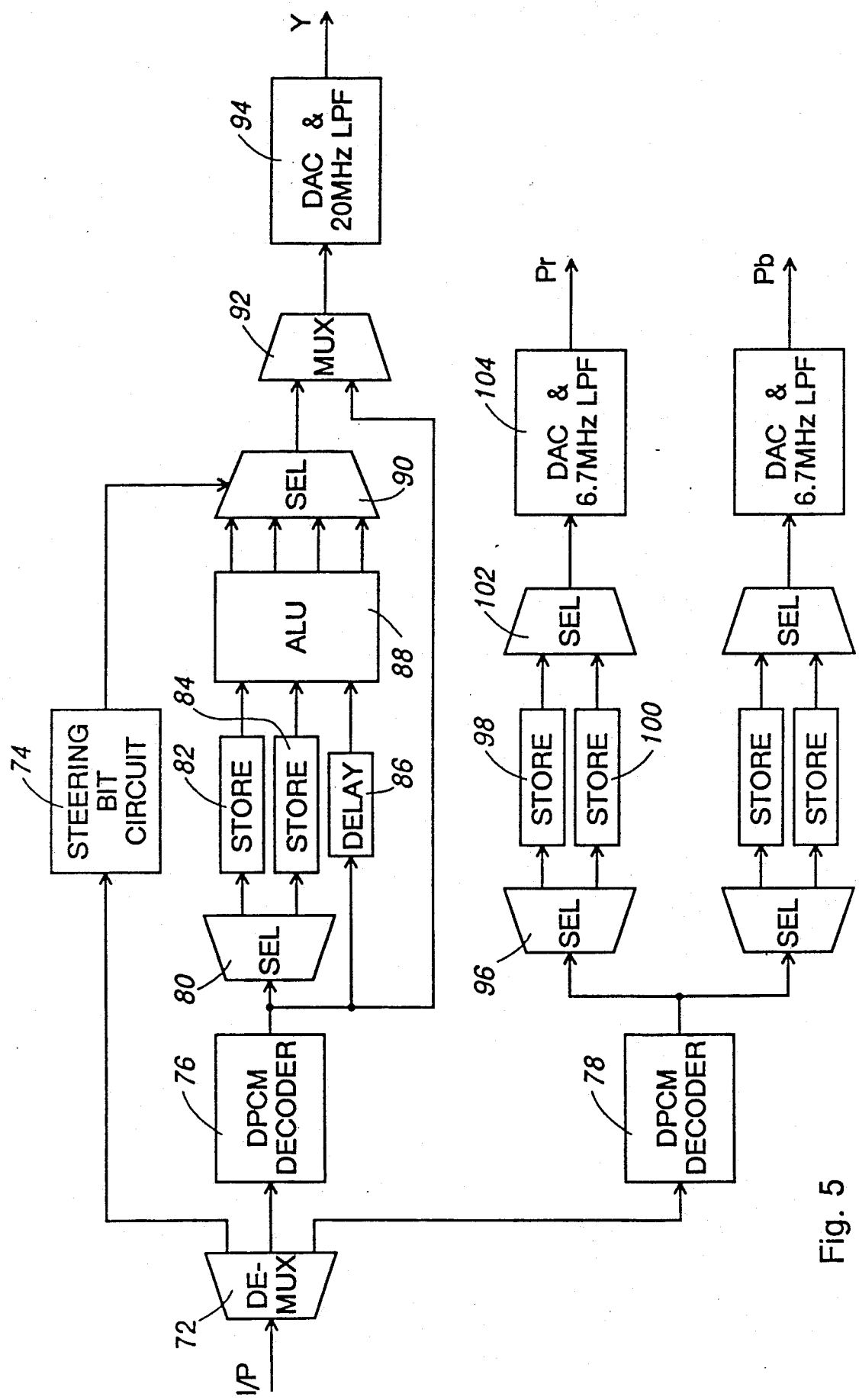
FIG. 5 is a block diagram illustrating a digital HDTV signal decoder which is complementary to the encoder of FIG. 4.

FIG. 5 is a block diagram illustrating a decoder which complements the operation of the encoder of FIG. 4 to reproduce the analog baseband luminance signal Y and the analog baseband chrominance signals Pr and Pb from an input (I/P) signal. As the timing signals for the decoder correspond to those of the encoder as described above, these are not shown in FIG. 5.

The input signal is demultiplexed by a demultiplexer 72, which supplies the 2-bit steering codes to a steering bit circuit 74, the 5-bit DPCM luminance signals to a DPCM decoder 76 which reproduces 8-bit digital luminance signals for the transmitted pixels, and the 4-bit DPCM chrominance signals to a DPCM decoder 78 which reproduces 7-bit digital chrominance signals.

The luminance signals from the DPCM decoder 76 are supplied to a decoder arrangement comprising a selector 80, stores 82 and 84, an equalizing delay circuit 86, an ALU 88, and a 1-from-4 selector 90, the components 80 to 88 being arranged and operating in a similar manner, for the transmitted luminance signals, to the components 60 to 68 of the encoder. The ALU 88 in this case produces at its four outputs the quantities $(A+B)/2$, $(A+C)/2$, $(B+C)/2$, and $((A+B)/2+C)/2$, and the closest one of these to the original magnitude of each non-transmitted pixel is selected by the selector 90 in dependence upon the respective steering code bits which are supplied from the circuit 74 to control this selector 90. The reconstructed non-transmitted pixels from the output of the selector 90, and the transmitted pixels directly from the DPCM decoder 76, are selected in turn by a multiplexer 92 and supplied to a DAC (digital-analog converter) and 20 MHz LPF (low pass filter) 94 to produce the reconstituted luminance signal Y.

The chrominance signals from the DPCM decoder 78 are supplied to two similar channels for the two color component signals Pr and Pb respectively; accordingly only the channel for the component signal Pr is described here, the Pb channel operating in the same manner except for an opposite video line phase to accommodate the transmission of the two color component signals in alternating video lines.

The chrominance signals from the DPCM decoder 78 are supplied via an arrangement comprising an input selector 96, two stores 98 and 100, and an output selector 102, to a DAC and 6.7 MHz LPF 104 which produces the reconstituted chrominance signal component Pr. The selectors 96 and 102 are operated with opposite phases, with a period of four video lines, to use the stores 98 and 100 alternately for writing and reading chrominance signals for the lines. In this respect the operation of the selectors 96 and 102 is similar to the operation of the selector 60 in the encoder, except that the selection periods are changed in view of the alternating chrominance signal component transmitted on successive video lines. Thus the incoming chrominance signals supplied via the selector 96 are stored in the store 98 during a first video line and repeatedly read out, or oversampled, from this store during the next two video lines; during a second video line the incoming chrominance signals are supplied to the other chrominance channel; and during a third video line the incoming chrominance signals are stored in the store 100 from which they are repeatedly read out during the following two video lines.

Although the above description relates to a relatively simple manner of transmitting and reconstituting the chrominance signal information, this can be sufficient for the resolution of the human eye. More complex encoding schemes for communicating the chrominance information can alternatively be used. For example, an interpolation can be performed among transmitted chrominance component signals in order to reconstitute the signals in a more accurate manner, and/or the same procedures as described above for the luminance information can be applied to the chrominance information. However, the manner in which the chrominance information is communicated primarily affects the quality of the reconstituted video signal, as it is perceived by the human eye, rather than the bandwidth which the total compressed video signal requires and which the present invention reduces.

In addition, although the above description relates to providing two steering bits for each steering code, this need not be the case and fewer or more steering bits may be provided. For example, a single steering bit could be used as a steering code for each non-transmitted pixel, to select either a first magnitude, which may for example be a weighted average of all three adjacent transmitted pixels A, B, and C, or a second magnitude, which may for example be an average of two of these three adjacent transmitted pixels or the magnitude of the pixel B in the same video signal line. Furthermore, more complex arrangements may be provided in the encoder and decoder to permit, for example, a 3-bit steering code to be used to represent the luminance of both of the non-transmitted pixels P and Q in relation to the luminance magnitudes of the adjacent transmitted pixels A, B, C, and D collectively.

Numerous other modifications, variations, and adaptations may be made to the described embodiment without departing from the scope of the invention as defined in the claims.

What is claimed is:

1. A method of providing a compressed digital video signal comprising the steps of:
   providing digital video signal samples at a sampling frequency, the samples representing respective pixels in lines of a video signal;
   determining groups each of three successive samples in each video signal line, the groups in adjacent lines being offset from one another;
   representing a first sample in each group by a first number of bits;
   comparing each of a second and a third sample in each group with magnitudes derived in a predetermined manner from a plurality of adjacent first samples to determine a closest match; and
   representing each of the second and third samples in each group by a second number of bits indicative of the closest match, the second number being less than the first number.

2. A method as claimed in claim 1 wherein the plurality of adjacent first samples comprise an adjacent first sample in each of the previous, same, and following video signal lines.

3. A method as claimed in claim 2 wherein the magnitudes with which each second or third sample is compared include an average of at least two of the adjacent first samples in the previous, same, and following video signals lines.

4. A method as claimed in claim 2 wherein the magnitudes with which each second or third sample is compared comprise an average of each combination of two of the three adjacent first samples in the previous, same, and following video signal lines.

5. A method as claimed in claim 4 wherein the magnitudes with which each second or third sample is compared further comprise a weighted average of the three adjacent first samples in the previous, same, and following video signal lines.

6. A method as claimed in claim 5 wherein the second number is two.

7. A method as claimed in claim 1 wherein the second number is two.

8. A method as claimed in claim 6 wherein the sampling frequency is an odd multiple of half the video signal line frequency, whereby the samples represent pixels which are offset from one another in adjacent video signal lines and the groups in adjacent lines are offset from one another by 1.5 samples.

9. A method as claimed in claim 1 wherein the sampling frequency is an odd multiple of half the video signal line frequency, whereby the samples represent pixels which are offset from one another in adjacent video signal lines.

10. A method as claimed in claim 9 wherein the groups in adjacent lines are offset from one another by 1.5 samples.

11. A method as claimed in claim 8 wherein the step of representing the first samples each by a first number of bits comprises differentially encoding the successive first samples.

12. A method as claimed in claim 1 wherein the step of representing the first samples each by a first number of bits comprises differentially encoding the successive first samples.

13. A method as claimed in claim 3 wherein the step of representing the first samples each by a first number of bits comprises differentially encoding the successive first samples.

14. Apparatus for compressing digital video signal samples representing respective pixels in lines of a video signal, comprising:
   timing means for determining groups each of three successive samples in each video signal line, the groups in adjacent lines being offset from one another;
   means for representing a first sample in each group by a first number of bits;
   means for comparing each of a second and a third sample in each group with magnitudes derived in a predetermined manner from a plurality of adjacent first samples to determine a closest match; and
   means for representing each of the second and third samples in each group by a second number of bits indicative of the closest match, the second number being less than the first number.

15. Apparatus as claimed in claim 14 wherein the means for representing the first samples each by a first number of bits comprises a DPCM encoder.

16. A method of providing a compressed digital video signal comprising the steps of:
   providing digital video signal samples at a sampling frequency, the samples representing respective pixels in lines of a video signal;
   in each video signal line, determining consecutive groups of samples each comprising three consecutive samples in the video signal line, the groups of samples in each video signal line being horizontally offset from the groups of samples in the immediately preceding video signal line and the immediately following video signal line;
   representing a first sample in each group of samples by a first number of bits;
   comparing each of a second and third sample in each group of samples with a plurality of magnitudes derived from an adjacent first sample in the same video signal line, an adjacent first sample in the immediately preceding video signal line, and an adjacent first sample in the immediately following video signal line; and
   representing each of the second and third samples in each group of samples by a second number of bits indicative of the closest comparison, the second number being less than the first number.

17. A method as claimed in claim 16 wherein the step of representing the first samples each by a first number of bits comprises differentially encoding the first samples of the consecutive groups of samples.

18. A method as claimed in claim 16 wherein the plurality of magnitudes comprise a plurality of averages of said adjacent first samples in the same, immediately preceding, and immediately following video signal lines, and wherein the second number is 2.

19. A method as claimed in claim 18 wherein the sampling frequency is an odd multiple of half the video signal line frequency, whereby the samples represent pixels which are offset from one another in adjacent video signal lines, and the groups of samples in adjacent video signal lines are horizontally offset from one another by 1.5 samples.

20. A method as claimed in claim 19 wherein the step of representing the first samples each by a first number of bits comprises differentially encoding the first samples of the consecutive groups of samples.

* * * * *